July 21, 1936.  J. M. HOTHERSALL  2,047,964

ELECTRIC WELDING

Filed June 23, 1933   5 Sheets-Sheet 1

INVENTOR
John M. Hothersall
BY Ivan R. Thornburgh
Charles H. Cope
ATTORNEYS

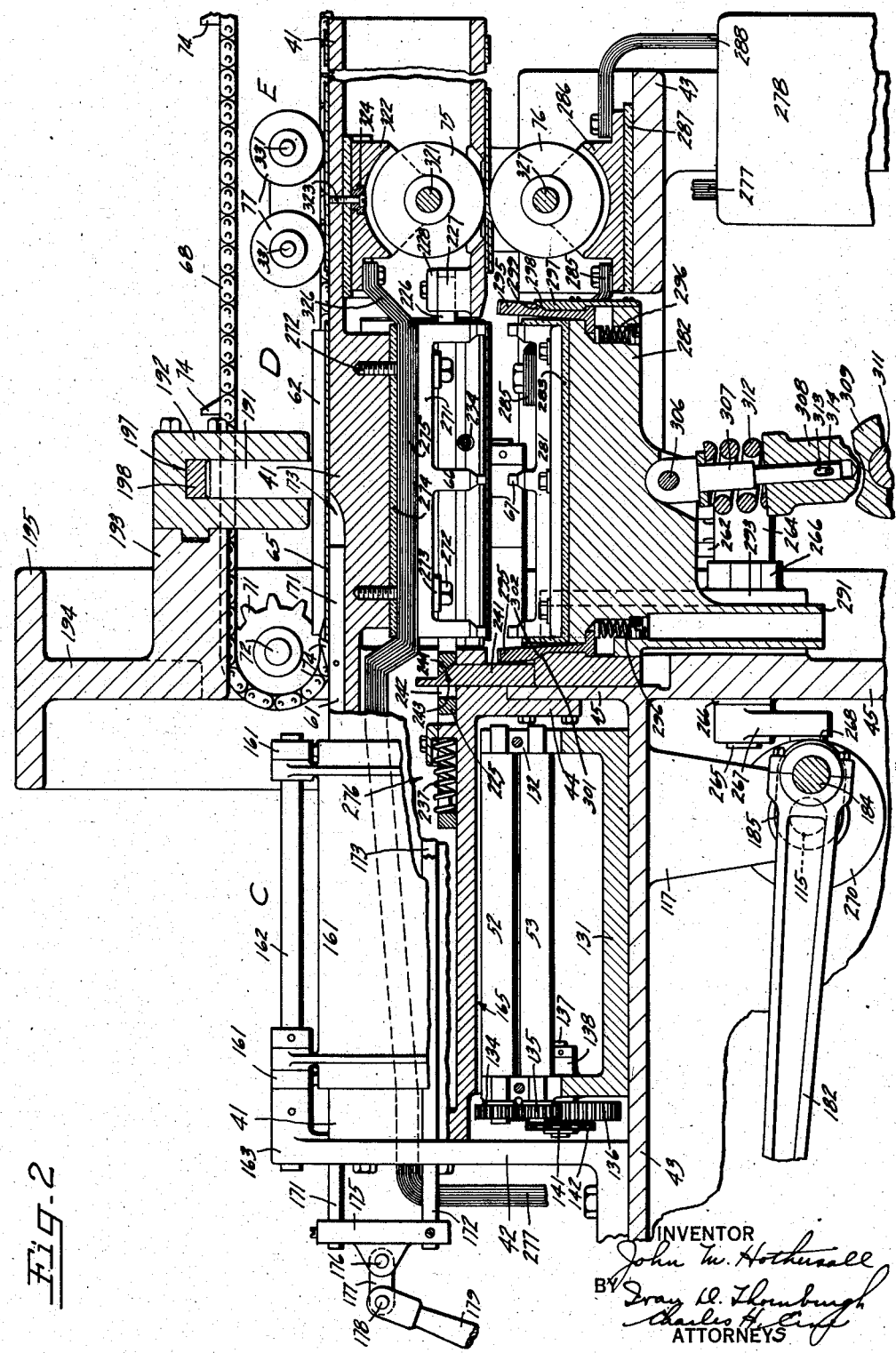

July 21, 1936.  J. M. HOTHERSALL  2,047,964
ELECTRIC WELDING
Filed June 23, 1933   5 Sheets-Sheet 3
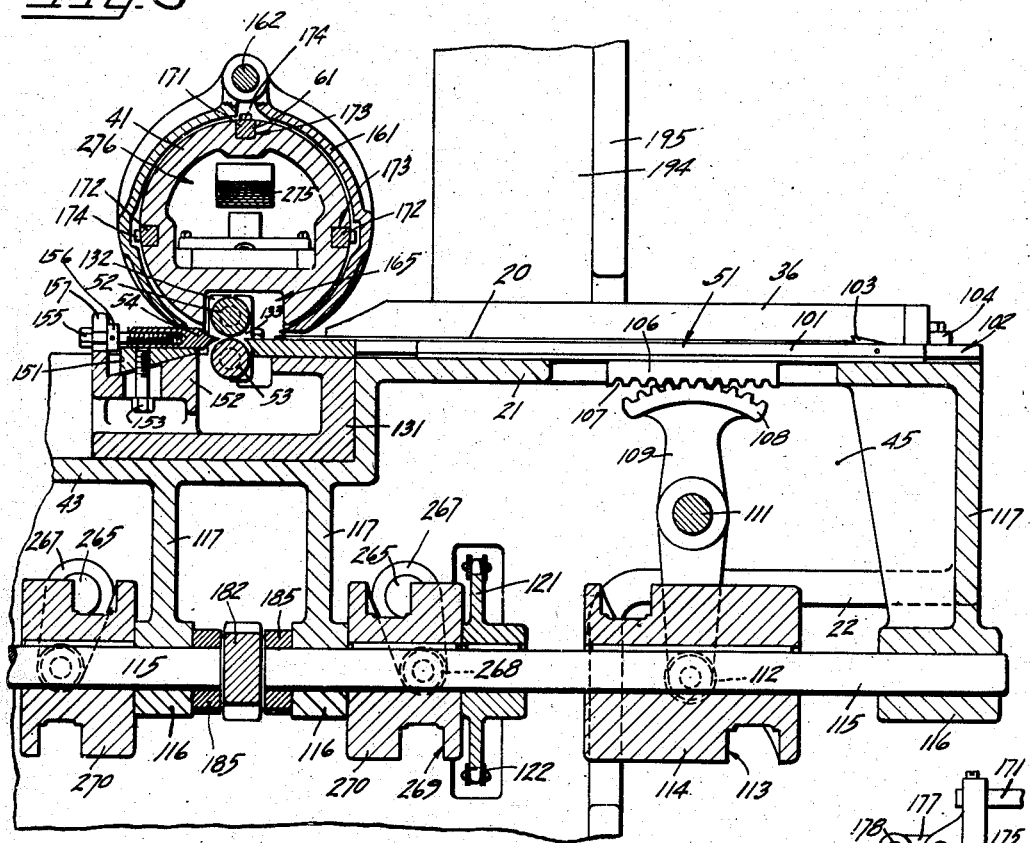
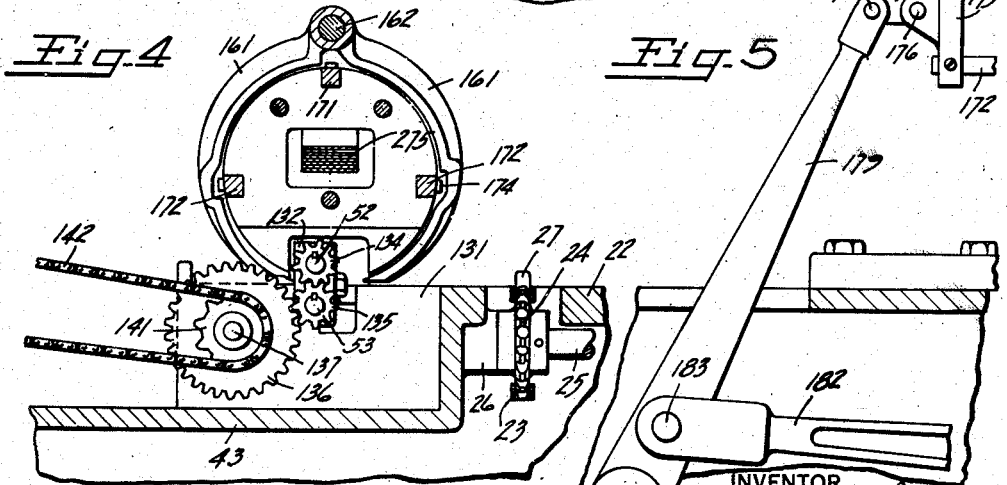
INVENTOR
John M. Hothersall
BY
ATTORNEYS

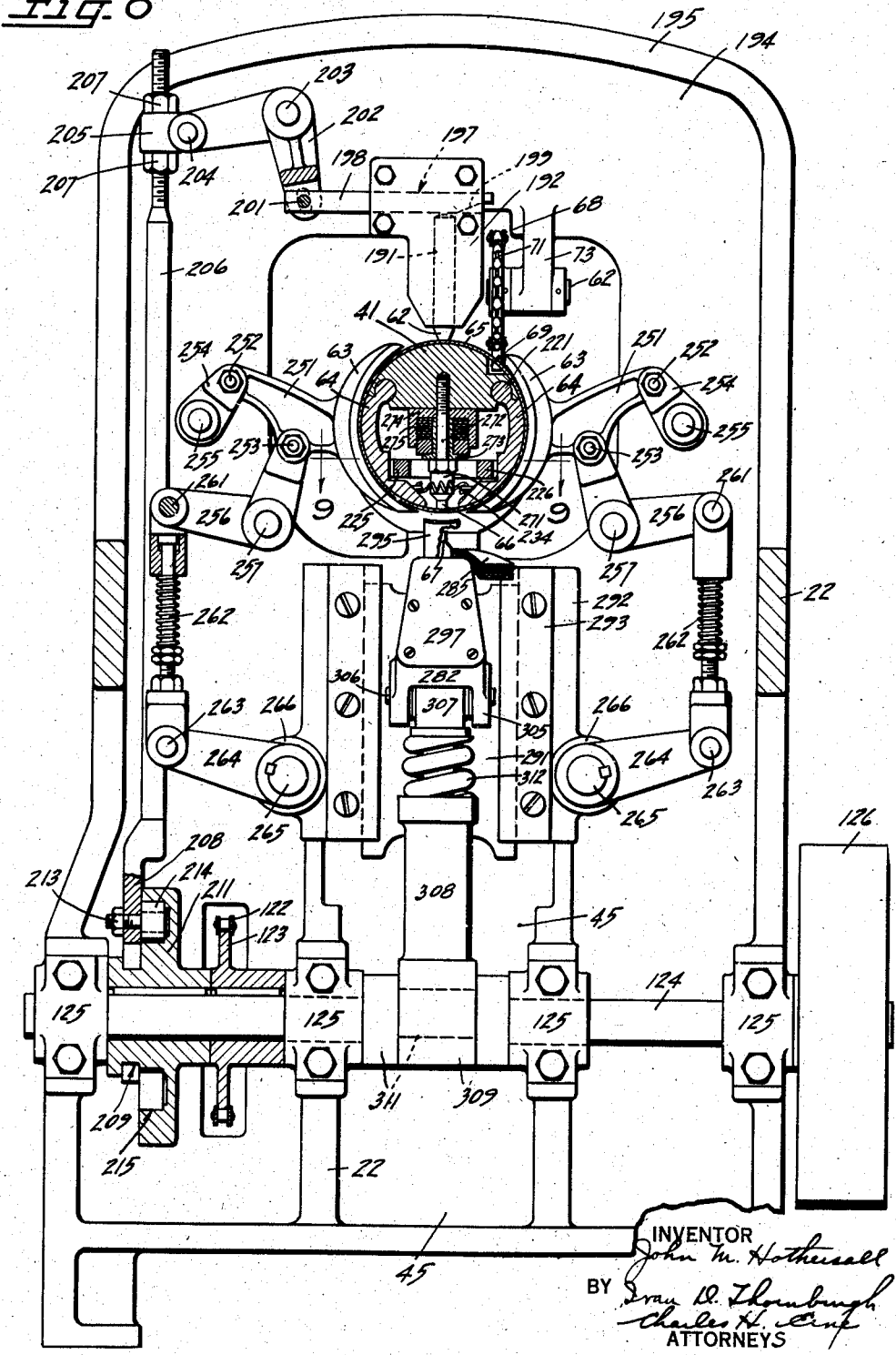

July 21, 1936.                J. M. HOTHERSALL                2,047,964
                                ELECTRIC WELDING
                             Filed June 23, 1933            5 Sheets-Sheet 5
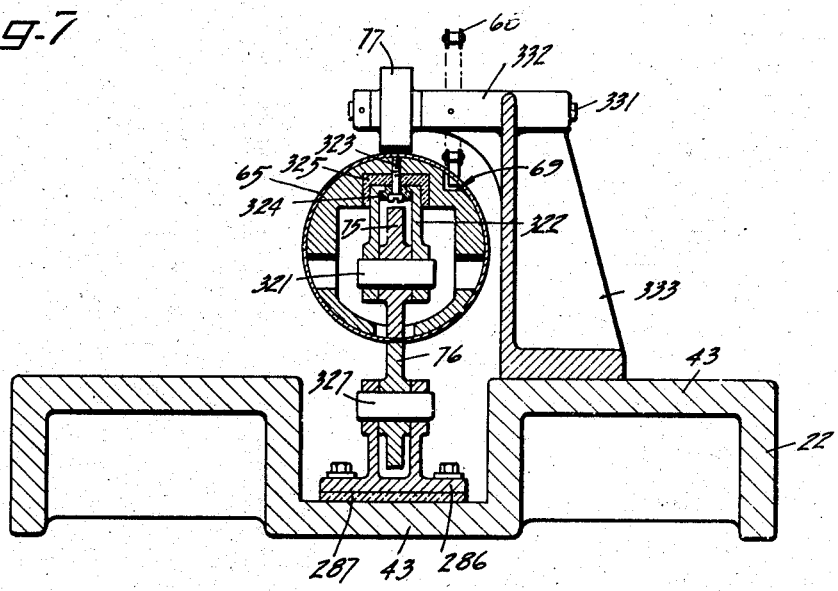
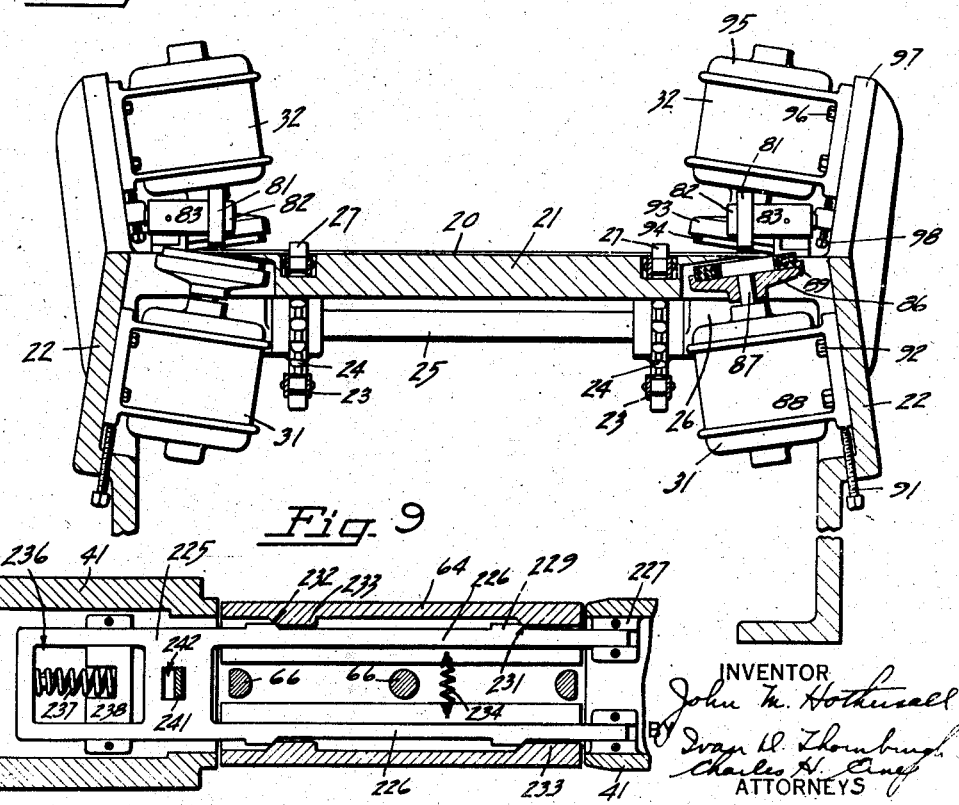

Patented July 21, 1936

2,047,964

UNITED STATES PATENT OFFICE 2,047,964

ELECTRIC WELDING

John M. Hothersall, Brooklyn, N. Y., assignor to American Can Company, New York, N. Y., a corporation of New Jersey Application June 23, 1933, Serial No. 677,329

7 Claims. (Cl. 219—6)

The present invention relates to forming and welding apparatus and has for its object generally, simplification of the welding step as it is applicable to the welding of tubular bodies by means of which such bodies are formed and conveyed in processional order through the forming and welding operations from which they emerge fully welded.

The invention contemplates forming a blank into tubular shape as it is brought over a mandrel and then moving this tubular shape along the mandrel in one direction, during which time its edges are brought together and united in a welded side seam and a welded body produced.

In an apparatus embodying the present invention blanks are received at the entrance end of the machine, are conveyed without interruption through a preparation station, through a body forming station and then through a welding station, the fully welded tubular bodies produced from the blanks being finally discharged from the exit end of the machine, all of the operations being performed in an expeditious manner.

An important object of the present invention is the provision of an apparatus of the character described into which the blanks are successively introduced and from which fully welded tubular bodies are discharged, the blank edges being first prepared for welding, the blanks then being shaped into tubular form and sized to produce bodies of a predetermined diameter with their prepared edges held together, and these edges being then welded in continuous side seams, all of the operations being performed with speed and precision.

A feature of interest in the present invention is the provision of roller electrodes associated with the forming mandrel and positioned and held in the path of travel of advancing tubular bodies conveyed along the mandrel and which are so backed up during welding and are so coordinated in their performance as to produce side seam welds in the bodies which are of uniform thickness and which are substantially homologous with the other portions of the body walls.

A further important object of the invention is the provision of a forming mandrel for a welding apparatus which is adapted to receive tubular bodies as they are formed from flat blanks and which is further adapted to sustain and guide the bodies as they are conveyed therealong, first through devices for uniting adjacent edges and for tacking together portions of these edges to hold the bodies to a predetermined size and to form side seam joints and secondly, through the welding devices so that the tubular bodies as discharged from the mandrel have fully welded side seams.

Numerous other objects and advantages of the invention will be apparent as it is better understood from the following description, which, taken in connection with the accompanying drawings, discloses a preferred embodiment thereof.

Referring to the drawings:

Fig. 2 is an enlarged longitudinal section taken through the forming mandrel being substantially a section along the line 2—2 in Fig. 1;

Fig. 3 is an enlarged transverse sectional view partly broken away taken substantially along the line 3—3 in Fig. 1;

Fig. 4 is an enlarged fragmentary sectional detail taken substantially along the line 4—4 in Fig. 1;

Fig. 5 is an enlarged sectional detail taken substantially along the line 5—5 in Fig. 1;

Figure 1:
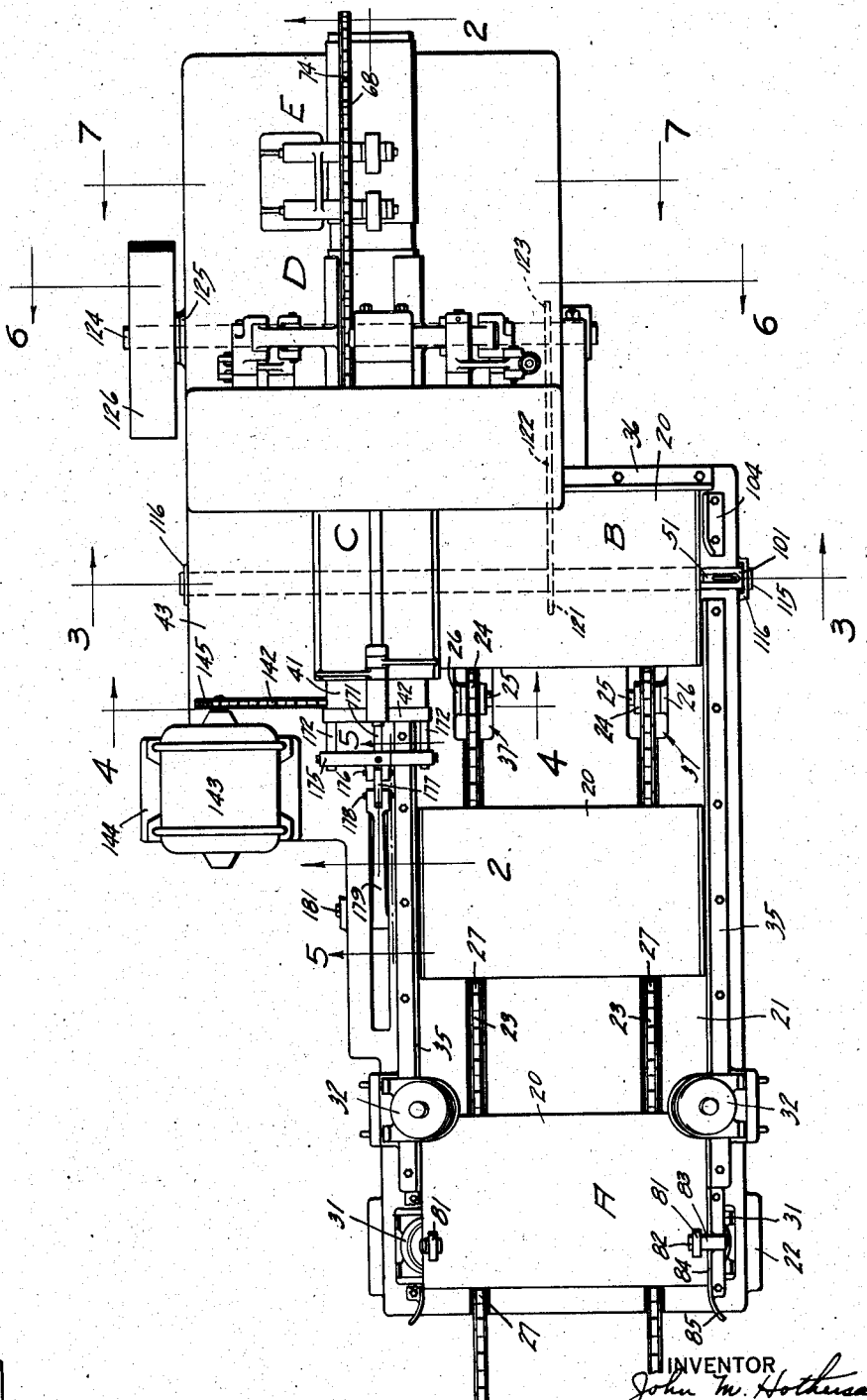
Figure 1 is a top plan view of an apparatus embodying the present invention.

Figs. 6 and 7 are enlarged transverse sectional details taken substantially along the respective lines 6—6 and 7—7 in Fig. 1;

Fig. 8 is a transverse sectional detail taken through the blank supporting table and illustrating the grinding mechanism for thinning opposite edges of the blank; and Fig. 9 is a plan sectional detail of a part of the sizing mechanism being taken substantially along the line 9—9 in Fig. 6.

General description of apparatus functions

Blanks 20 (Figs. 1 and 8) are introduced into the apparatus in any suitable manner and are passed over the surface of a table 21 which may form an integral part of the main frame indicated by the numeral 22. Advancement of the blanks over the table 21 is effected by a pair of conveyor chains 23 which, at their machine ends, pass over sprockets 24 carried on a horizontal shaft 25. This shaft 25 is journaled in bearings 26 formed in the frame 22 and may be operated in any suitable manner, just so its rotation is synchronized with other operating parts.

Each conveyor chain 23 carries spaced lugs 27 which engage behind the blanks 20 and positively propel them forward over the surface of the table, the blanks first passing through a grinding station A (Fig. 1). Two lower grinding devices 31, one on either side, and two upper devices 32 of similar construction are located at this station. The lower devices thin or taper the edges of the sheet by grinding away a portion of its lower face and the upper devices in like manner grind away part of the top face. In this movement over the table the blanks are retained against lateral displacement by side guide rails 35 carried upon the table.

At the forward end of the table travel, the front edge of the blank comes against a cross bar 36 fixed to the table and comes to rest at a transfer station B (Fig. 1). In this position the blank has moved ahead of the lugs 27 on the chains 23 and chains and lugs move down through openings 37 cut in the table and pass back on the lower runs of the conveyor. This blank in station B is in position for transverse feeding into a forming station C.

A forming mandrel 41 (Figs. 1, 2 and 3) is located alongside of the blank resting at station B. This mandrel is supported at its rear end by a bracket 42 carried upon and bolted to a sub-table 43 which may be an integral part of the frame 22, the surface of the sub-table being below the surface of the table 21. A second support adjacent the rear end of the mandrel 41 is also had at 44 where it is bolted to a vertical web 45 of the frame 22. The parts 42, 45 rigidly hold the rear end of the mandrel 41 which, however, extends forward free and unsupported a considerable distance.

By means of such a construction, which mechanically is equivalent to that employed in many forms of body formers, the blanks 20 may be formed into tubular shape on the rear supported end of the mandrel but with their ends separated to clear the support 45 and after passing forward of such support may be brought into closed body form. The tubular bodies are then further advanced longitudinally of the mandrel, the free and unsupported forward section of the mandrel permitting such forward advancement.

The mandrel 41 is practically cylindrical throughout its entire length and roughly has a diameter approximating the inside diameter of the can body to be produced. The mandrel may be arbitrarily divided into a receiving section, the diameter of which is slightly larger than the can body diameter, this being adjacent the rear supporting end of the mandrel, a sizing section normally less in diameter than the inside body diameter but having an expandible part which produces a mandrel diameter of the desired inside can body diameter, and a supporting section extending toward the forward free end of the mandrel which is slightly smaller in diameter to permit easy movement of the can body after it has been sized and during its further movement along the mandrel. These mandrel features will be more evident as the description proceeds.

Transverse feeding devices 51 (Figs. 1 and 3) engage the off side of the blank 20 as it rests at station B and shift it laterally into forming rollers 52, 53 located under the rear supported end of the mandrel 41. These are feeding and forming rollers which carry the blank against a deflecting or bending plate 54. Cooperation of rollers and plate bends the blank into tubular form and shape, in cooperation also with the mandrel, while positioning it on the mandrel 41, the latter giving to the blank the proper interior shape.

A reciprocating feed slide unit 61 operates in the mandrel 41 and inside of the tubular blank form on the mandrel at station C. This unit moves longitudinally of the mandrel and on its forward stroke brings the blank form into a sizing and tacking station D (Figs. 1 and 2). The lower edges of the blank form are still apart when it comes to rest at station D.

The blank form is first engaged from above and along its middle section by a clamp bar 62 (Figs. 2 and 6) which holds it firmly on the mandrel at its top while its free sides are moved inwardly by side wings 63 which press against and wrap it around hinged sizing wings 64 carried in the mandrel 41.

This wrapping action brings the adjacent lower edges of the blank form into overlapped relation, these edges having been previously thinned by the grinding devices 31, 32, as previously described. A tubular body is thus formed and this body will hereinafter be designated by the numeral 65. The overlapped edges are next tacked together at spaced intervals by upper electrodes 66 (carried inside the mandrel and resting against the inside lap) and lower electrodes 67 which are brought up against the outside lap). These electrodes are means for tacking together the lapped parts of the body before the continuous welding.

The tubular body 65 with its tacked and overlapped edges is ready for the welding of these edges into a fully closed side seam. It is conveyed from station D along and off the forward or free end of the mandrel 41 by a continuously moving conveyor chain 68 (Figs. 1, 2, 6 and 7), a longitudinal slot 69 being formed in the surface of the mandrel for clearance.

This chain at its machine end passes over a sprocket 71 mounted on an idler shaft 72 carried in a bracket 73 formed in the frame of the machine. The chain may be operated by a drive sprocket located in any suitable position beyond the end of the mandrel 41, this movement of the chain being synchronized with the operations at the sizing and tacking station D. Spaced flights 74 carried by the chain engage behind the sized tubular bodies 65 and sweep them along the mandrel during which travel the welding operation is performed.

Just in advance of station D is a welding station E (Figs. 1 and 2) where the overlapped edges of the body pass between an upper roller electrode 75 located inside of the mandrel and a lower roller electrode 76 positioned beneath and in vertical alignment with the upper electrode and the mandrel. The passing body along its upper part passes beneath backing-up rollers 77 which hold the mandrel 41 and the electrode 75 against upward movement.

The resulting welded side seam of the overlapped body parts is pressed to a thickness substantially that of the thickness of the remaining body wall by means of the rollers 77. The overlapped edges have already been thinned and ground, it will be remembered, so that they are considerably less in combined thickness before welding than a double thickness of stock and the parts therefore need not be compressed very much to bring the seam weld to the desired thickness.

The description up to this point has only briefly set forth the major features of operation taking place as the body blanks 20 are first conveyed by the conveyor chains 23 then up and over the mandrel 41 and finally along the mandrel as fully welded tubular bodies 65 as carried by the conveyor chain 68. Fuller details of the operations and the parts performing the operations at the various stations will now be considered.

*Blank edge grinding*

A blank 20 moving over the surface of the table 21 and over the lower grinding devices 31 passes under two hold down rollers 81 (Figs. 1 and 8) one roller on each side edge of the blank. The lowermost part of each roller is just the thickness of the blank above the surface of the table. Each roller 81 is loosely mounted on a stud 82 which is carried in a bracket 83 mounted upon and carried by the table 21.

Each bracket is preferably formed with a guiding side wall 84 which is flared outwardly at its rear end 85 to properly receive the blank and guide it over the table. Each wall 84 aligns with its corresponding guide rail 35.

Each lower grinding unit 31 comprises a grinding disc 86 which is in vertical alignment and beneath the roller 81 on that side of the table. The disc 86 is mounted on a motor shaft 87 which is inclined inwardly from the vertical at its top being a high speed shaft of a motor 88. Each motor is bolted to a side wall of the frame 22.

An abrasive ring 89 provides the active grinding element which is carried in the disc 86 and its upper face adjacent its outer edge extends above the surface of the table and engages the lower face of the blank passing above and held down against the grinding ring by the roller 81. This grinding of the lower surface of the blank is confined to its outer edges. A supporting and adjusting bolt 91 threadedly secured in the frame of the machine preferably provides a means of vertical movement for the motor 88 to compensate for wear of the abrasive ring 89, bolts 92 clamping the motor in its adjusted position.

The upper grinding devices 32 are located a slight distance forward of the rollers 81 and these grind away a portion of the top surface of the blank adjacent its outer edges in exactly the same manner as the grinding step just described. A grinding disc 93 corresponds to the disc 86 of the lower grinding unit and carries an abrasive ring 94, which is rotated at high speed by a motor 95. Each motor 95 is secured by bolts 96 in an adjusted position on an upwardly extending bracket 97 formed in the frame 22 and located above the table 21. An adjusting and supporting bolt 98 threaded in the bracket 97 provides accurate adjusting means for positioning the motor 95 and the abrasive ring 94.

Transverse feeding of blank

The feeding device 51 at station B comprises a feed bar 101 (Figs. 1 and 3) which moves crosswise of the line of travel of the blanks 20 between stations A and B and this bar has sliding movement within a groove 102 cut in the surface of the table 21. This feed bar carries a spring pressed finger 103 which is just outside of one edge of the blank 20 as it comes to rest at station B. The guide rail 35 on this side of the machine terminates short of the rail 36 to permit free movement of the finger 103 with its feed bar and a supplemental guide rail section 104 mounted on the table 21 further guides the sheet edge.

The feeding stroke of the guide bar 101 is toward the left (Fig. 3) and its finger 103, engaging behind the edge of the blank 20 during such movement, shifts it laterally and carries it into the bite of the forming rollers 52, 53. The table 21 is cut out at 105 and a block 106 secured to the under surface of the feed bar 101 moves in this opening. The block 106 is provided with rack teeth 107 which are engaged by a rack segment 108 formed on the upper end of a lever 109.

Lever 109 is mounted for oscillation on a horizontal shaft 111 held in any suitable manner in the frame 22 of the machine. The lower end of the lever 109 carries a cam roller 112 which operates in a groove 113 of a barrel cam 114 keyed to a horizontal shaft 115. The shaft 115 is journaled in bearings 116 formed in bracket extensions 117 of the frame 22.

The shaft 115 carries a sprocket 121 (Figs. 1 and 3) which is rotated by connection with the drive shaft of the machine. For this purpose a chain 122 passes over the sprocket 121 and also over a sprocket 123 (Figs. 1 and 6) which is keyed to a horizontal drive shaft 124. The shaft 124 is journaled in bearings 125 formed in the frame 22. This shaft is rotated in any suitable manner as by application of power to a belt pulley 126 carried on one end of the shaft.

Blank forming into tubular shape

The blank 21 upon being inserted into the bite of the rollers 52, 53 is carried against the deflecting plate 54 and raised upwardly and over the mandrel 41 as already briefly described. These rollers 52, 53 are carried in a cage 131 (Figs. 2, 3 and 4) which is held in the frame 22 of the machine, this cage resting upon the sub-table 43. The rollers are journaled in split bearing blocks, each formed by a projection 132 extending upwardly from the cage 131 on each end of the rollers and by a bearing cap 133 bolted to each part 132. The rollers 52, 53 are geared together for unity of rotation, the upper roller 52 carrying a gear 134 meshing with a similar gear 135 carried by the lower roller 53.

Gear 135 meshes with a gear 136 mounted on a stub shaft 137 held in a bearing 138 formed in the cage 131. The shaft 137 also carries a sprocket 141 which may be an integral part of the gear 136 and a drive chain 142 passes over this sprocket. Chain 142 is driven by a motor 143 (Fig. 1) located on an extension 144 of the sub-table frame 43, the chain passing over a sprocket 145 carried by the motor shaft.

The deflecting plate 54 (Fig. 3) is carried upon a wedge block 151 which is mounted upon an inclined platform 152 formed in the cage 131. The position of the wedge block relative to the inclined platform determines the height of the deflecting plate 54 and shifting of these parts adjusts the plate relative to the rollers. In adjusted position the parts are locked together by a bolt 153. The deflecting plate 54 is also adjusted forward and back. An adjusting bolt 155 threadedly engages the plate and carries a collar 156, collar and bolt head being on opposite sides of a slot 157 formed in a wall of the cage 131.

As the blank 20 is bent and shaped around the mandrel 41 it is guided through a pass formed by pivoted guide wings 161 (Figs. 2 and 3) hung over the mandrel and held in spaced position but close to its outer surface. There is a wing 161 on each side of the mandrel and the lower or free end of each reaches to a position a short distance above the surface of the table 21.

Each wing is pivotally mounted on and suspended from a fixed rod 162 which is supported at one end in a boss 163 formed in the upper end of the bracket 42. The mandrel 41 is cut away at its bottom, adjacent its rear end, in a recess or pocket 165 and the upper roller 52 extends into this pocket.

Transfer of tubular shape along mandrel

The transfer of the tubular blank form or shape along the mandrel 41 by the feed bar unit 61 from station C into the sizing and tacking station D is effected by three reciprocating bars in the feed slide unit 61. These include an upper center bar 171 (Figs. 1, 2 and 3) and two side bars 172 which have sliding movement within grooves 173 cut in and extending longitudinally of the mandrel. Each bar carries a spring pressed dog 174 which engages behind the blank form as it rests at station C and these dogs force it forward with their forward movement.

The bars 171, 172 are connected at their rear ends by a cross head 175 (Figs. 1 and 5) which is pivotally connected at 176 to a link 177 which in turn is pivotally connected at 178 to the upper end of an arm 179 pivotally mounted on a stud 181 carried in the frame 22.

This arm 179 is rocked back and forth by connection with a crank carried on the shaft 115. A connecting rod 182 (Figs. 2 and 5) is pivotally connected at 183 to the arm 179 and the opposite end of this rod 182 surrounds a crank pin 184 carried in spaced crank arms 185 (see also Fig. 3) secured to the shaft 115. This crank pin and arms tie together two sections of the shaft 115 and these two sections as to their operations constitute a single shaft and are so described.

Swinging of the arm 179 through the crank connection just described is transmitted to the feed bars 171, 172 which, on their forward movement, transfer the tubular blank form along the mandrel 41 moving it from station C into station D.

*Sizing, overlapping and connecting edges to form tubular bodies*

The tubular blank form at station D is first securely clamped to the mandrel along its top by the clamping bar 62 as previously described. This bar 62 is formed with an upward extension 191 (Figs. 2 and 6) which has sliding movement within a bracket 192 bolted to a boss 193 projecting outwardly from a web 194 of an arch 195 formed in the frame 22.

The bracket 192 is slotted transversely at 197 and a wedge member 198 is slidingly supported in the slot. The wedge member 198 is formed with a bottom inclined forward wall 199 which presses down on the upper end of the bar extension 191 to clamp it into holding position. Movement of the wedge is effected by means of the following parts.

The wedge member 198 is pivotally connected at 201 to one arm of a bell crank lever 202 which is adapted to rock on a stud 203 held in the web 194 of the frame. The opposite arm of the bell crank lever is pivotally connected at 204 to a collar 205 which is adjustably held on a vertical connecting rod 206 by clamp nuts 207. The rod 206 at its lower end is enlarged into a yoke 208. The legs of the yoke section extend into an annular groove 209 cut in the hub of a cam 211 which is keyed to the drive shaft 124. Yoke 208 carries a stud 213 which supports a roller 214 adapted to operate in a groove 215 formed in the face of the cam 211.

The hinged side sizing walls 64 of the mandrel 41 will now be described in detail and their actions in sizing the mandrel will be noted. These walls are formed with rounded heads 221 (Fig. 6) which are mounted in sockets formed in the mandrel. Outward sizing movement of the sizing wings 64 is effected by a sliding plate 225 (Figs. 2, 6 and 9) which moves inside and longitudinally of the mandrel 41.

The plate 225 is formed at its forward ends into two arms 226 which are slidingly supported in blocks 227 carried in the mandrel. A cap 228 (Fig. 2) is bolted on the top part of each block 227 and these caps hold the arms 226 in sliding position.

Each arm 226 along its outer side wall is formed with small bumps or extensions 229 having tapered faces 231 along the forward edges. These faces are adapted to ride against tapered faces 232 formed in rear edges of projections 233 extending inwardly from the side wings 64. The wings 64 may be yieldingly tied together near their bottom free edges by a spring 234 which insures collapse of the mandrel walls when the plate 225 is slid back to disengage its projections 229 and the wing projections 233.

The rear end of the slide 225 is apertured at 236 and a spring 237 is located within the opening, being interposed between the end of the slide at the back and a stationary block 238 carried in the mandrel 41 and extending up into the opening. This spring when not compressed holds the slide in its retracted position with the side wing walls 64 collapsed.

The slide 225 is moved forward when sizing the mandrel and then the projection faces 231 are forced against the faces 232 moving out the side wings. This outward or sized position is maintained by the slide projections 229 sliding in between the wall projections 233 and locking the wings against inward movement. This forward movement of the slide takes place against the action of the spring 237 which is compressed by such movement.

Forward movement of the slide 225 to effect such sizing is made by a vertically movable plate 241 (Figs. 2 and 9) the top of which extends upwardly through an opening 242 cut vertically through the slide. The plate 241 adjacent its top end is formed with an inclined wall 243 which engages with a similar inclined wall 244 formed at one end of the opening 242. Upward movement of the plate 241 is transmitted through the inclined surfaces into the longitudinal forward movement of the slide 225.

Wrapping of the sides of the tubular blank forms around the sized mandrel follows immediately. Each side wing 63 is formed with a body 251 (Fig. 6) which is pivotally mounted at two places designated 252, 253. Pivot 252 is carried by an arm 254 loosely mounted on a stud 255 held in the frame web 194. The pivot 253 connects with one arm of a bell crank lever 256 which has rocking movement on a stud 257 also fixed in the web 194.

The bell crank lever 256 of each side wing 63 is rocked on its stud 257 to carry its side wing into body wrapping position, the arm 254 holding the wing for substantially a horizontal movement. This form of construction is used in some can body makers. The other arm of the bell crank lever is pivotally connected at 261 to the upper end of a telescoping spring held connecting rod unit 262 which is pivotally connected below at 263 to an arm 264 keyed to a rock shaft 265.

Each rock shaft 265 (Figs. 2, 3 and 6) is journaled in a bearing 266 formed in the web 45 of the frame and on the opposite side of the web the shaft carries an arm 267 (Figs. 2 and 3). Each arm 267 carries a cam roller 268 which operates in a groove 269 of a barrel cam 270 keyed on the shaft 115. The two cams 270 are spaced on opposite sides of the crank arms 185 as best illustrated in Fig. 3 and operate their side wings 63 so that one edge of the blank is laid down first and the other edge is then lapped over it.

The tubular body 65 thus formed is held tightly wrapped against the sized walls of the mandrel 41, the engaged thinned or ground overlapped edges being then in condition for the tacking operation which follows. The tacking operation accomplished by the electrodes 66, 67 will now be described in detail.

The upper electrodes 66 (Figs. 2 and 6) are preferably formed as projections of an electrode body 271 which is secured to the mandrel 41 by bolts 272, these bolts being properly insulated from the electrode body by an insulating sleeve 273. The electrode body 271 is completely insulated from the mandrel by a channel member 274 interposed between the body and the mandrel.

Laminated copper or other suitable electrical conducting strips 275 are shown by way of example to provide an electrical path for the welding current. The strips are held in electrical connection with the electrode body 271 by the bolts 272 but these strips are also insulated from the frame of the machine by the channel member 274.

The strips 275 may extend rearwardly through the mandrel 41 which is formed hollow with a central chamber 276 (see also Fig. 3). The strips pass through the bracket 42 beyond which they may be carried in any suitable manner. For example the strips may be extended as at 277 and connect (as shown on the right, lower side of Fig. 2) to a transformer box 278 or other suitable source of electrical welding energy.

The lower electrodes 67 are preferably formed as upwardly extending projections of an electrode body 281 which is mounted upon a cross head or body hammer member 282 being insulated from the latter by a channel member 283. Such an electrode body may electrically connect by laminated copper or other suitable strips 285 with a cage 286 associated with the lower electrode 76 of the welding unit. This cage is insulated from but is secured to the frame 43, an insulating plate 287 being used for this purpose. The cage 286 is electrically connected by means of laminated strips 288 to the other side of welding transformer 278.

The cross head 282 (Figs. 2 and 6) is an integral part of a slide 291 which has vertical movement within guideways formed in a projecting part 292 of the frame web 194. Guideplates 293 secured to the web retain the slide 291 in its sliding position.

Raising of the cross head 282 brings the electrodes 67 into electrical connection with the overlapped edges of the tubular body 65 but the ends of the overlapped edges are first registered or made even as the cross head ascends. These registering elements are carried in the cross head and are of a construction found in some can body makers. They comprise flipper members 295 carried at the ends of the electrode body 281 from which they are electrically insulated. Each flipper 295 is mounted upon a spring 296 carried in the cross head and as the latter moves upwardly the upper ends of the flippers strike against the mandrel 41. This arrests their upward movement but the cross head continuing upwardly, slides along the flippers as the springs 296 yield.

The front flipper 295 is held in place by a plate 297 the upper edge of which is beveled at 298 and as cross head and plate move upwardly this inclined surface 298 slides on and pushes over an inclined surface 289 formed on the front face of the flipper.

The rear flipper 295 is confined between a rear wall of the cross head 282 and the plate 241 which is secured to and which is moved by the cross head. As this plate 241 slides upwardly over the arrested flipper 295 an inclined surface 301 of the plate engages and slides along an inclined surface 302 formed in the rear face of the flipper and the top of the latter moves forward. The overlapped edges of the body 65 are thus caught between the two moving flippers and are brought into exact registration prior to the electrodes 67 meeting the body.

The continued upward movement of the cross head 282 then brings the electrodes 67 into welding position on the body edges and a spot weld at intervals along such edges results. The flippers 295 at such time remain in holding position as their springs 296 yield and take up the full movement of the cross head. This spot welding I term a tacking operation, and the electrodes 67 are means for this purpose.

The cross head is raised and lowered by connection with the drive shaft 124. Lugs 305 (Figs. 2 and 6) are formed in the cross head and pivotally connected at 306 to the upper end of a headed bolt 307. This bolt extends into the upper end of a pitman 308 which is formed with a cylindrical base 309 encircling a crank section 311 formed in the drive shaft 124. The bolt 307 passes through a spring 312 and provides a yielding connection between the cross head and the pitman.

The lower end of the bolt 307 is cross-slotted at 313 and a pin 314 passing through the slot and held in the pitman body prevents disconnection between the parts. This yielding connection provides a cushion for the lower electrodes 67 and insures the proper pressure against the overlapped and interposed seamed parts for forming the desired spot welds.

Side seam welding

The welding of the body 65 as it is moved from station D through the welding station E and between the roller electrodes 75, 76 will now be described. As the body leaves the sizing station the mandrel expanding and sizing parts are again in the collapsed state and the mandrel at this station is then smaller than the encircling tack-seamed tubular body. The body is thus easily moved when engaged by a lug 74 of the chain 71.

Electrode 75 is mounted for rotation on a shaft 321 (Figs. 2 and 7) which is carried in a cage 322 mounted inside of the hollow mandrel. It is secured to the mandrel by a bolt 323. This bolt is insulated from the cage by a washer 324 and an insulating channel member 325 is interposed between cage and mandrel to insulate these parts from one another. The cage 322 and shaft and electrode are electrically connected in the welding circuit by an extension 326 of the laminated strips 275 bolted to the cage.

The lower roller electrode 76 is mounted upon a shaft 327 which is carried in the cage 286 previously described. This cage is also in the electric welding circuit by the strips 288 connecting directly with the transformer box. As soon as the overlapped and tacked edges of the tubular body 65 pass into engagement with the electrode rollers 75, 76 the body wall completes the welding circuit and a welding current then flows through the lapped body parts and the continuous welded side seam results.

The hold down rollers 77 or backing-up means to oppose the welding pressure and for insuring an even thickness of the welded seam are each mounted upon a stationary shaft 331. Each shaft is carried in a boss 332 formed in the upper end of a bracket 333 which is mounted upon and carried by the sub-table 43 of the frame 22. The rollers turn freely on their shafts, the passing bodies propelled by the chain 71 determining this roller movement. The rollers 77 are spaced above the upper surface of the mandrel 41 and never touch it, the rollers riding free on their shafts in between successive tubular bodies passing along the mandrel.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for producing welded tubular bodies from flat body blanks comprising, in combination, a forming mandrel, means for supporting said mandrel at one end thereof, roller means for forming flat body blanks into tubular shape and positioning them on the mandrel, means for overlapping adjacent edges of said tubular shapes to form tubular bodies, feeding means for moving said bodies along said mandrel through a welding station adjacent the unsupported end of said mandrel, roller electrodes in said welding station through which the overlapped edges of said body are passed by said feeding means to weld them in a side seam, and backing-up means at said station for cooperating with said electrodes to press the said overlapped seamed section into substantially the same thickness as the thickness of said body wall.

2. In an apparatus for producing welded tubular bodies from flat body blanks comprising, in combination, a forming mandrel, roller means for forming flat body blanks into tubular shapes for positioning them on the mandrel adjacent one end, means for moving said tubular shapes along said mandrel and through a plurality of stations and thence off of its opposite end, sizing devices located at one of said stations for bringing together and overlapping adjacent edges of said tubular shapes to form tubular bodies of predetermined diameter, registering elements at said sizing station for bringing the ends of said overlapped edges into register, tacking elements also at said sizing station for connecting said overlapped edges to maintain the said size diameter of body, and welding means at a welding station for uniting said connected edges in a welded side seam.

3. In an apparatus for producing welded tubular bodies from flat body blanks comprising, in combination, means for grinding the meeting edges of said blanks, a forming mandrel, means for conveying the ground body blanks to adjacent said mandrel, means for supporting said mandrel at one end thereof, means for forming flat body blanks into tubular shape and positioning them on the mandrel, means for overlapping adjacent edges of said tubular shapes to form tubular bodies, feeding means for moving said bodies along said mandrel through a welding station adjacent the unsupported end of said mandrel, roller electrodes in said welding station through which the overlapped edges of said body are passed by said feeding means to weld them in a side seam, and backing-up means at said station for cooperating with said electrodes to press the said overlapped seamed section into substantially the same thickness as the thickness of said body wall.

4. In an apparatus for producing welded tubular bodies from flat body blanks comprising, in combination, a forming mandrel, means for forming flat body blanks into tubular shapes and simultaneously positioning them on the mandrel adjacent one end, means for moving said tubular shapes along said mandrel and through a plurality of stations and thence off of its opposite end, sizing devices located at one of said stations for bringing together and overlapping adjacent edges of said tubular shapes to form tubular bodies of predetermined diameter, registering elements at said sizing station for bringing the ends of said overlapped edges into register, and welding means at a welding station for uniting said connected edges in a welded side seam.

5. In an apparatus for producing welded light gauge metal can bodies from flat body blanks, comprising in combination, a mandrel having a diameter substantially equal to the diameter of the can body to be produced, means mounted adjacent one side of said mandrel for forming flat body blanks into tubular shapes and for positioning them on the mandrel adjacent an end thereof, means including an expanding section within said mandrel for holding the edges of said tubular shapes in lapped position and for sizing the same to the desired can body diameter, means for moving said tubular shapes along said mandrel and toward its opposite end, and welding means operating on opposite sides of the lapped edges of said sized tubular shapes while passing along said mandrel for connecting said edges in continuous welded side seams.

6. In an apparatus for producing light gauge metal can bodies from flat body blanks, comprising in combination, a forming mandrel having a receiving station slightly greater in diameter than the desired diameter of the can body being formed, a sizing section expandible to the same diameter and a supporting section of less diameter, said mandrel receiving and guiding the can bodies through their formative stages, means for forming flat body blanks into tubular shapes while laterally positioning them on the receiving section of said mandrel, means for moving said tubular shapes longitudinally of said mandrel and through said sizing and supporting sections, means cooperating with said sizing mandrel section for bringing said tubular shapes into desired can body diameter, and welding devices arranged in said mandrel supporting section for operating on adjacent edges of said sized tubular shapes to connect said edges in continuous welded side seams.

7. In an apparatus for producing welded light gauge metal can bodies from flat body blanks, comprising in combination, an elongated forming mandrel for supporting the cam bodies as formed, said mandrel embodying an expandible sizing section, means arranged at one side of said mandrel for forming flat body blanks into tubular shapes the while positioning them laterally on the mandrel adjacent one end, means for moving said tubular shapes longitudinally of said mandrel through a plurality of stations and thence off of its opposite end, means at one of said stations for expanding said mandrel sizing section while simultaneously bringing said tubular shapes into desired can body diameter, and welding means located at one of said stations for engaging said sized tubular shapes as they are moved longitudinally of the mandrel by said moving means and for connecting their edges in continuous welded side seams.

JOHN M. HOTHERSALL.